United States Patent
Umeda (10) Patent No.: US 7,382,481 B2
(45) Date of Patent: Jun. 3, 2008

(54) IMAGE COMMUNICATION DEVICE, METHOD OF COMMUNICATING IMAGE, PROGRAM AND RECORDING MEDIUM

(75) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/995,602

(22) Filed: Nov. 23, 2004

(65) Prior Publication Data

US 2005/0111054 A1    May 26, 2005

(30) Foreign Application Priority Data

Nov. 25, 2003    (JP) .............................. 2003-394363

(51) Int. Cl.
*H04N 1/40*    (2006.01)
*H04N 1/44*    (2006.01)
*G06F 15/00*    (2006.01)
*H04L 9/00*    (2006.01)

(52) U.S. Cl. ..................... 358/1.15; 358/1.13; 358/453; 358/448; 358/400; 358/440; 358/468; 358/462; 380/243; 380/28

(58) Field of Classification Search ............... 358/1.15, 358/1.9, 3.28, 501, 518, 2.1, 1.13, 453, 448, 358/400, 440, 468, 462; 399/299, 2, 67, 399/71, 108; 380/243, 28

See application file for complete search history.

(56) References Cited

U.S. PATENT DOCUMENTS

| 5,596,640 | A   |   | 1/1997 | Ohta |
| 6,363,148 | B1 | * | 3/2002 | Sako ........................... 380/28 |
| 6,888,645 | B1 | * | 5/2005 | Fujimoto et al. ............ 358/1.9 |

FOREIGN PATENT DOCUMENTS

| JP |   7-023239 | A |   | 1/1995 |
| JP |  07-143302 |   | * | 6/1995 |
| JP |   9-130585 | A |   | 5/1997 |
| JP |   9-149230 | A |   | 6/1997 |

* cited by examiner

*Primary Examiner*—David K Moore
*Assistant Examiner*—Charlotte M Baker
(74) *Attorney, Agent, or Firm*—Canon USA Inc I.P. Div (57) ABSTRACT

An image communication device transmitting image information selectively generates a transmission-result report, where the contents of the transmission-result report vary depending on selected transmission conditions. Under a first condition, the transmission-result report contains only transmission-result information of the image information. Under a second condition, the transmission-result report contains the transmission-result information of the image information and the image information itself.

8 Claims, 9 Drawing Sheets

YYYY/MM/DD

Dear OO

Subject : Introduction of New System on which OOOOO for realizing hith-speed high-precision output and newest technological achievements are mounted and, moreover, a variety of tools
  The synergetic effect enables the formation of a high-efficient prepress environment.

Form : console
Coping system : electrostatic transfer system
Photosensitive material : OPC
Developing system : two-component
                         development
Fixing system : heat-roller
Resolution :
    reading   : 400 dpi
    recording : 800 dpi × 400 dpi
Gradation number : 256

JobNo. : 0123
Time : 2004/22 19:22
Addressee : **********
Number of sheets : 5
Result : OK
Processing time : 00'10
Department No. : 2052

JobNo. : 0123
Time : 2004/22 19:22
Addressee : **********
Number of sheets : 5
Result : OK
Processing time : 00'10
Department No. : 2052

1001

1002

1003

1004

1005

IMAGE COMMUNICATION DEVICE, METHOD OF COMMUNICATING IMAGE, PROGRAM AND RECORDING MEDIUM

BACKGROUND OF THE INVENTION

1. Field of the Invention

The present invention relates to an image communication device with which a transmission-result report including the transmission result of image information can be output, a method of communicating an image, a program, and a record medium.

2. Description of the Related Arts

Hitherto, multifunction printers (hereinafter, abbreviated to MFP) have a facsimile send/receive function. When facsimile-transmission is carried out by means of an MFP, an original is read through a scanner, and stored in a memory unit provided in the MFP. After the connection to a reception-end is established, the original image data stored in the memory unit is sent to the reception-end. After the transmission is completed, the transmission-result report, which contains all or part of the transmitted original data and addressee information, is printed by the MFP. This informs the facsimile-sender that the transmission has been completed. There are also MFPs that have network transmission functionality. With these MFPs, an original image is read through a scanner and is transmitted to a network using electronic mail or a file transfer protocol such as SMB (Server Message Block) or the like. In the case of transmitting an original image by use of the above-described network transmission function, the transmission-result report is printed by the MFP.

In the event that original image data cannot be transmitted to a reception-end for some reason, i.e., due to an error or the like, the transmission-result report is also printed by the MFP, so that the facsimile-sender is informed that the transmission was not successfully completed. Referring to the output of the transmission-result report, one of the following processes 1, 2, and 3 can be selected by setting the MFP in advance:

1. The report is output for all of the originals that have been transmitted.
2. The report is output only in the case in which an error occurs during transmission.
3. No report is output.

In recent years, additional functionality such as secure printing, secure sending/received, or the like has been provided for MFPs so that highly confidential information that is printed or received via facsimile cannot be seen or read by others. That is, the highly confidential information is stored in the MFP's memory unit. In order to access and obtain a hardcopy of the highly confidential information, a user inputs authentication information, i.e., a password, through the MFP's operator panel identifying the user as a person permitted to access the highly confidential information.

In a facsimile or network secure transmission, document-image data is typically encrypted on the sending-end by a public key cryptosystem, a common key cryptosystem, or the like, and is then transmitted. The received data is then decrypted on the reception-end. As such, the security of the data is protected when it is transmitted through an open or unsecured system such as a public telephone circuit. In addition, for example, when secret communication is selected, information such as image information, communication-result information, a communication-management report, and so forth is not output, as disclosed in, e.g., Japanese Patent Laid-Open No. 7-143302.

Referring to the above-described conventional examples, when the facsimile or network transmission is carried out by use of an MFP, certain problems arise. In particular, a transmission-result report to which an image transmitted from the MFP is added is printed after the transmission. For example, even if a secure transmission mode is adopted, a part of an image provided on a document for which high security is required is printed on the transmission-result report.

Moreover, if, as described above, the MFP is set so that no transmission-result report is printed, no transmission-result report is printed when a normal transmission mode, not a secure transmission mode, is adopted. Thus, it is difficult to check the transmission. Also, in the case where the MFP is set so that a transmission-result report can be output when a transmission error occurs, the above-described problems also arise.

SUMMARY OF THE INVENTION

It is an aspect of the present invention to provide an image communication device, a method of communicating an image, a program, and a recording medium that solve the above-described problems.

It is another aspect of the present invention to selectively generate and output a transmission-result report containing image information that has been transmitted and a transmission-result report not containing the image information that has been transmitted.

It is still another aspect of the present invention to generate second image information based on an image that has been transmitted and to generate a transmission-result report containing the second image information.

Further aspects, features and advantages of the present invention will become apparent from the following description of the exemplary embodiments (with reference to the attached drawings).

DETAILED DESCRIPTION OF THE EMBODIMENTS

Hereinafter, exemplary embodiments of the present invention are described in detail with reference to the accompanying drawings.

Figure 1:
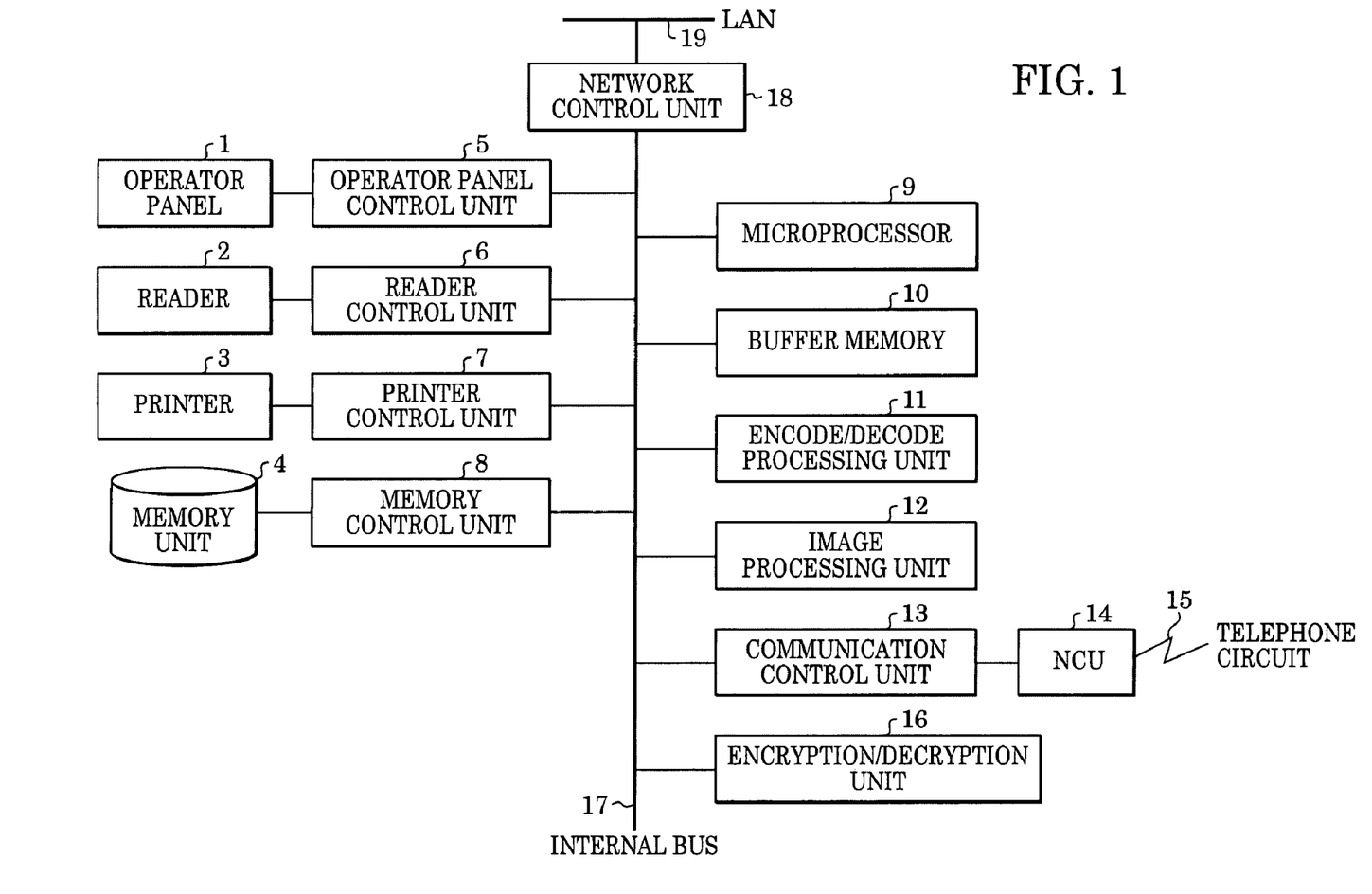
FIG. 1 is a block diagram of the hardware configuration of an MFP according to the present invention.

The first embodiment of the present invention will now be described. FIG. 1 is a block diagram of the hardware configuration of an MFP according to the present invention.

Operator panel 1 includes dials, switches, etc., that are manipulated by a user to initiate operations such as copying and facsimile transmission. In addition, other operations associated with copying or facsimile transmission, such as magnification or reduction, and input of an addressee telephone number, are done so via the operator panel 1. Operator panel 1 may include other types of user interfaces, such as LCDs, touch screens, etc. or any other user interface that would enable practice of the present invention. In addition, any other operations other than those previously described that would enable practice of the present invention are applicable.

A reader 2 generates an image signal by electro-optically scanning a document placed on the document plate (not shown) of the reader 2. The content of the document is read with electro-optical conversion elements such as CCDs or the like (not shown), which are arranged in a line along the main scanning direction, while the conversion elements are moved perpendicular (i.e., sub-scanning direction) to the main scanning direction. Thus, electronic image data is generated. The image data read by the reader 2 is stored in a buffer memory 10 via a reader control unit 6.

A printer 3 is used to form an image on recording paper based on the image data read by the reader 2 or a reception signal transmitted via a telephone circuit 15, and operates by an electro-photographic system. Referring to the output of image data to the printer 3, the image data stored in the buffer memory 10 is transferred to the printer 3 via the printer control unit 7.

A memory unit 4 stores the image data read through the reader 2 or a reception signal transmitted via the telephone circuit 15. The memory unit 4 is composed of a nonvolatile memory such as a hard disk or the like. Through the buffer memory 10, image data or a reception signal is stored in the memory unit 4, and the image data or the reception signal stored in the memory unit 4 is later read out.

An operator panel control unit 5 controls the operator panel 1. In particular, the control unit 5 analyzes an instruction input through the operator panel 1 by a user, and transfers the content of the instruction to a microprocessor unit 9.

A reader control unit 6 controls the reader 2. That is, it drives the reader 2 so that the reader 2 can read the content of a document placed on the document plate, and also causes the buffer memory 10 to store the read image data when commanded by the microprocessor unit 9.

A printer control unit 7 controls the printer 3. That is, the unit 7 acquires image data or a reception signal from the buffer memory 10 and outputs the data or the signal to the printer 3 when commanded by the microprocessor unit 9. Moreover, the printer control unit 7 causes the printer 3 to be driven corresponding to the output of the image data, so that the image is output, i.e., printed on recording paper.

A memory control unit 8 controls the memory unit 4. That is, the memory control unit 8 causes the memory unit 4 to store data transferred from the buffer memory 11, and also causes the memory unit 4 to output data to the buffer memory 10 when commanded by the microprocessor unit 9.

The microprocessor unit 9 controls the operation of the entire MFP. In particular, the microprocessor unit 9 controls the respective blocks shown in FIG. 1, so that operations such as scanning, printing, facsimile reception/sending, and so forth are carried out. The microprocessor unit 9 contains a ROM for storing a program or the like to execute the operations shown in FIG. 2, and a RAM for temporarily storing control data.

When the content of a document is read through the reader 2, image data is read out from the memory unit 4, or data is acquired by facsimile-reception or through a LAN 19, the buffer memory 10 temporarily stores the image data or reception signal.

Moreover, when image data is printed with the printer 3, image data is stored in the memory unit 4, or data is output by facsimile-transmission or via the LAN 19, the image data or transmission signal is output from the buffer memory 10.

An encode/decode processing unit 11 encodes (i.e., compresses) image data or a transmission signal stored in the buffer memory 10, or decodes (i.e., expands) compressed image data or a compressed reception signal.

An image processing unit 12 carries out different types of image processing and processing for the enhancement of image qualities, such as the determination of an image area or the like. These processing operations are initiated by a user via operator panel 1. According to the present embodiment, the image processing unit 12 changes the resolution of image data to be transmitted so as to meet the capability on the reception-end when facsimile-transmission is carried out.

A communication control unit 13 controls the communication between the MFP and other communication devices connected to a telephone circuit 15. The facsimile transmission and reception are carried out via the communication control unit 13. NCU (Network Control Unit) 14 controls a network, i.e., controls the connection so that the telephone circuit 15 can be used for data communication or the like. An encryption/decryption unit 16 encrypts image data and decrypts encrypted image data.

An internal bus 17 is used to connect the respective blocks to each other. Through the internal bus 17, image data is transferred, and commands and settings for operation of the respective blocks are transmitted or received. A network control unit 18 is located between the internal bus 17 and the LAN 19. The network control unit 18 carries out protocol conversion between the external LAN 19 and the internal bus 17. The network control unit 18 enables the buffer memory 10 to store image data input via the external LAN 19, enables the printer 3 to output, i.e., print, the image data, or enables the memory unit 4 to store the image data, as in the case of image data read through the reader 2.

Figure 3:
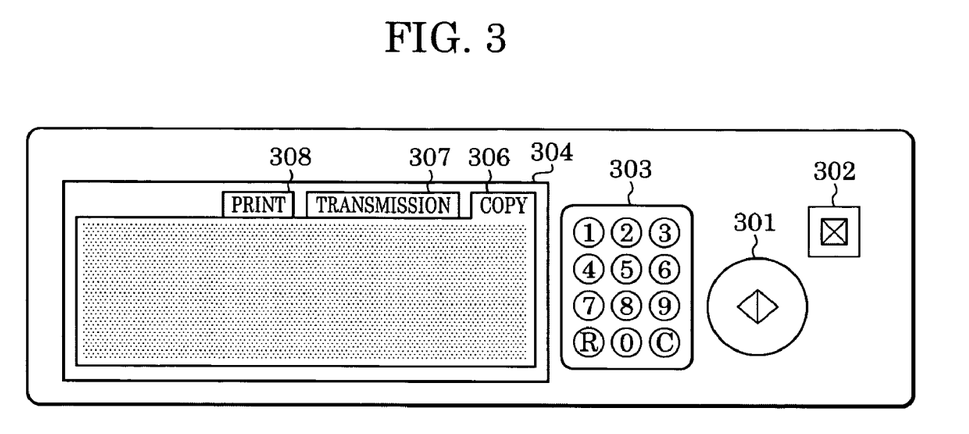
FIG. 3 shows an example of the configuration of the operator panel of the MFP according to a first embodiment of the present invention.

FIG. 3 shows an example of the configuration of the operator panel 1 provided for the MFP according to the present embodiment. In FIG. 3, a start button 301 is pressed to start the copying operation when the copying operation is selected. Moreover, when the facsimile-transmission operation is selected, selection of the start button 301 results in scanning a document placed on the reader's 2 document plate as described above.

An operation-stop button 302 is pressed during the copying-operation or facsimile-transmission operation of the MFP to stop the copying operation or facsimile transmission operation. A ten-key 303 is composed of numeral and non-numeral buttons. The numeral buttons are used to input settings, e.g., the number of copy sheets, a magnification/reduction ratio, and a password. The non-numeral buttons include a "C" button for clearing a value which has been input through the ten-key for setting or inputting a password, and an "R" button for nullifying the contents which have been set in the MFP to restore the MFP to the initial state.

In the MFP, various settings and the values of the settings are displayed in a display 304. A copying operation selection section 306 is defined inside the display 304. The MFP displays different settings for the copying operation on the display 304 when a user touches the copying operation selection section 306. Similarly, a facsimile-transmission operation selection section 307 and a printing-operation selection section 308 are provided inside the display 304. As with the copying operation, the MFP displays different settings for the facsimile-transmission operation or the printing operation on the display 304 when a user touches the respective sections 307, 308.

Figure 4:
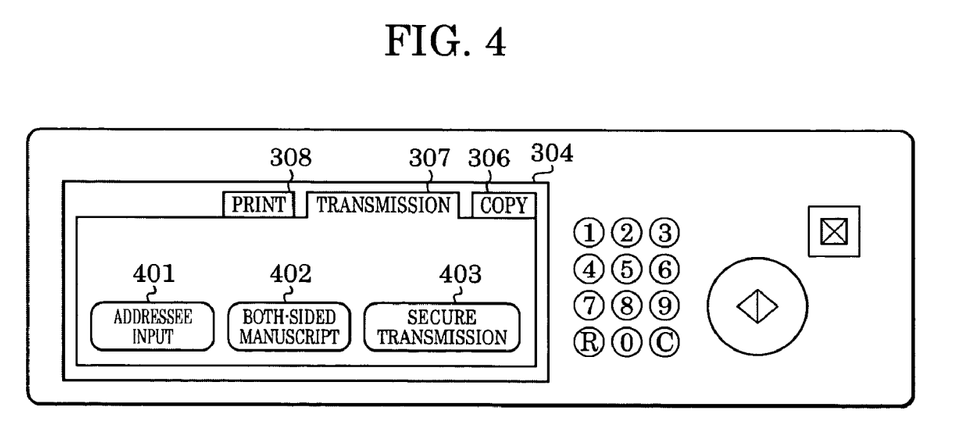
FIG. 4 shows an example of a display for setting the facsimile-transmission.

FIG. 4 shows an example of the facsimile-transmission setting display that appears on the display 304 when a user selects the facsimile-transmission selection section 307. Four types of settings are provided for the facsimile-transmission.

In FIG. 4, a button 401 is used to set an addressee for the facsimile-transmission. An addressee's telephone number input display (not shown) appears on the display 304 when the button 401 is selected. The addressee's telephone number is input using the ten-key 303. After the telephone number is inputted, the display 304 returns to the state shown in FIG. 4. According to the present embodiment, the telephone number of an addressee is used to identify the addressee. However, any other information that would enable practice of the present invention, such as the addressee's electronic mail address, may be used to identify the addressee.

Button 402 is used for selection of a double-sided document. When the button 402 is selected, the button 402 is grayed-out (not shown) on display 304. When the facsimile-transmission is carried out in this state, the reader 2 reads image data on both the front and back sides of a document, and the image data is stored into the memory unit 4. When the button 402 is selected again, the display 304 returns to the state shown in FIG. 4, and the double-sided document setting is cancelled.

Button 403 is used to select secure-transmission. When the button 403 is selected, the button 403 is grayed-out (not shown) on display 304, and the secure facsimile-transmission is carried out. When the button 403 is selected again, the display 304 returns to the state shown in FIG. 4, and the secure transmission setting is cancelled. After the addressee is inputted, and selection of either or both of the setting of double-sided document and secure transmission are completed, the MFP begins the facsimile-transmission when the start button 301 is pressed.

Figure 2:
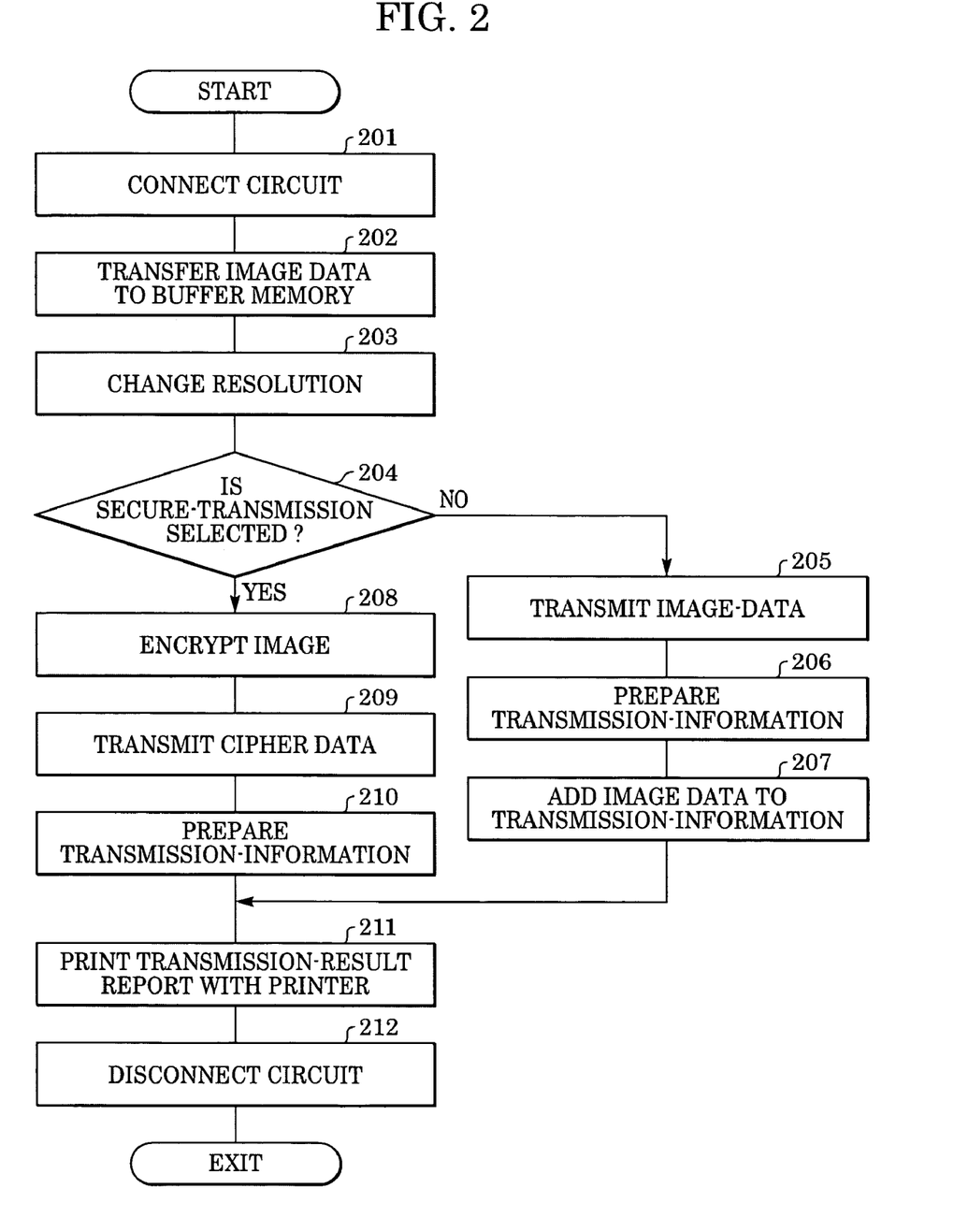
FIG. 2 is a flow-chart showing the facsimile transmission operation of the MFP according to a first embodiment of the present invention.

FIG. 2 is a flow-chart showing the facsimile-transmission operation carried out by the MFP of the present embodiment. In this case, it is presumed that image data to be transmitted is read through the reader 2 and stored in the memory unit 4 prior to the processing.

First, button 401 shown in FIG. 4 is selected to connect the MFP to the telephone circuit 15 via the telephone number of an addressee (step S201). After connection is established, image data to be transmitted is read from the memory unit 4 and stored into the buffer memory 10 (step S202). Thereafter, the resolution of the image data is changed to match that the resolution of a printing means provided on the reception-end (step S203). The resolution information of the printing means provided on the reception-end is acquired in advance as addressee information when the MFP is connected to the reception-end through the telephone circuit 15 in step S201.

The change of resolution in step S203 is carried out by the image processing unit 12. In order to accomplish the resolution change, the image data stored in the buffer memory 10 is transferred to the image processing unit 12 and after the resolution is changed, by the image processing unit 12, the modified image data is transferred back to the buffer memory 10.

Upon completion of the resolution change, the MFP checks whether secure transmission has been selected (step S204), where as previously described, secure transmission is selected via button 403 in FIG. 4. In the case where secure transmission is not selected, the MFP carries out normal transmission (step S205). Normal transmission consists of outputting image data stored in the buffer memory 10 to the telephone circuit 15 via the communication control unit 13 and the NCU 14 without performing any secure transmission processing, such as encryption of the image data stored in the buffer memory 10.

After the transmission to the reception-end is completed, the MFP acquires the information on the transmission from the microprocessor unit 9, and bit map data of the transmission information is generated in the buffer memory 10 so that the transmission information can be printed with the printer 3 (step S206). Then, a part of the image data transmitted in step S205 is added to the bit map data of the transmission information generated in the buffer memory 10. Thus, data for use as a transmission-result report is generated in the buffer memory 10 (step S207).

In the case where it is determined in step S204 that secure transmission is selected, the MFP encrypts image data stored in the buffer memory 10 (step S208). For this purpose, the image data stored in the buffer memory 10 is transferred to the encryption/decryption unit 16 via the internal bus 17, and then encrypted.

The encryption carried out in the encryption/decryption unit 16 can be any type of encryption that would enable practice of the present invention, such as RSA, ElGamal ciphers, elliptic curve ciphers. After the image data is encrypted, it is then stored in the buffer memory 10.

After the encryption, the MFP outputs the encrypted image data from the buffer memory 10 to the telephone circuit 15 via the communication control unit 13 and the NCU 14 (step S209). Upon completion of the transmission, the MFP acquires the information on the transmission from the microprocessor unit 9 to generate a transmission-result report, and generates the bit map data of the transmitted information in the buffer memory 10 to print the data with the printer 3 (step S210). The transmission information generated in the buffer memory 10 in step S210 may be the same as or different from the transmission information generated in step S206. In the case of secure transmission, the transmitted image data is not added. That is, the transmission information generated in step S210 is a transmission-result report only.

After the transmission information is generated, the MFP outputs the transmission-result report generated in the buffer memory 10 with the printer 3 (step S211), and disconnects the connection to the reception-end (step S212). Thus, the facsimile transmission is completed.

Figure 5:
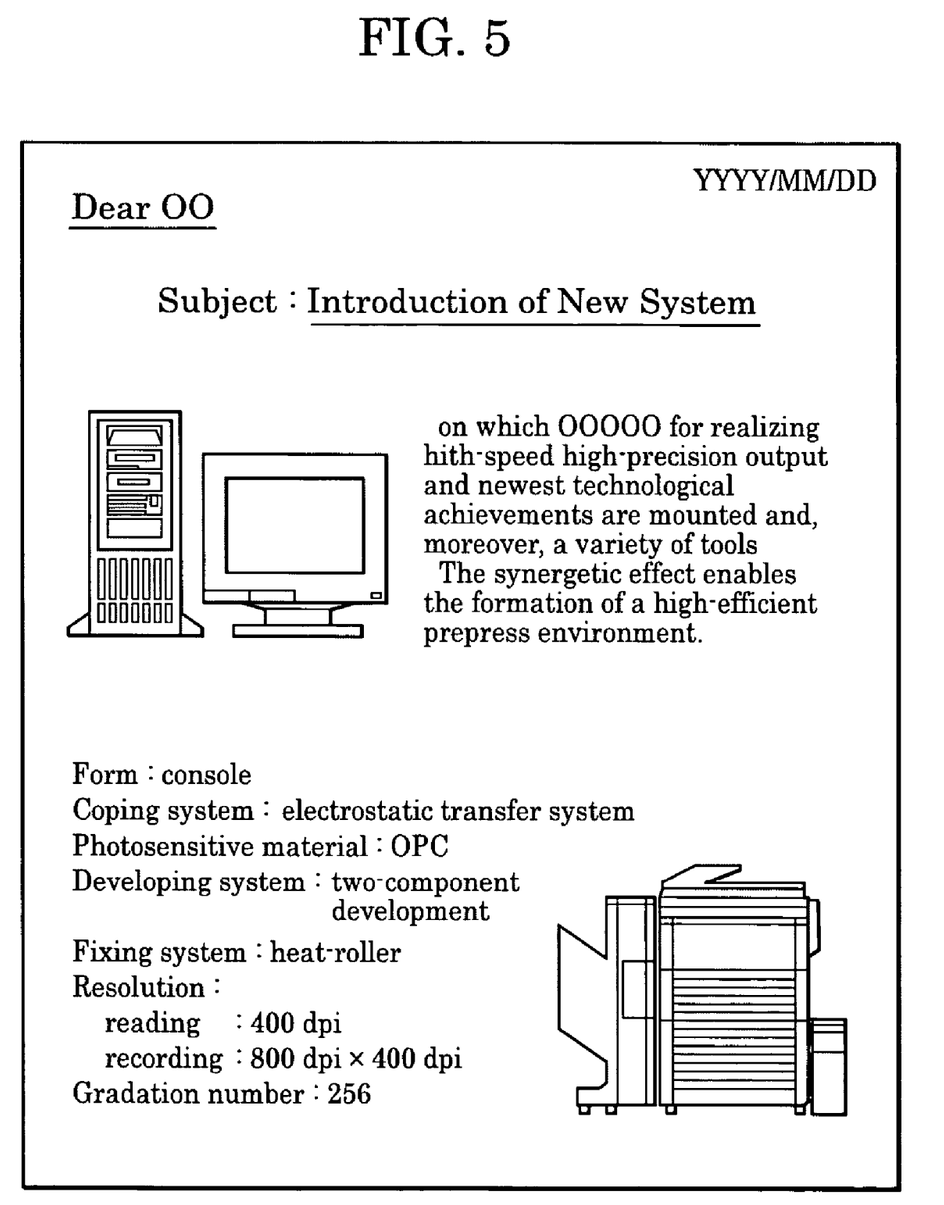
FIG. 5 shows an example of the first page of a document to be facsimile-transmitted.

The transmission-result reports generated in the facsimile transmission is described with reference to FIGS. 5 to 7. FIG. 5 shows an example of the first page of a manuscript to be transmitted by facsimile. In the case of the MFP of the present embodiment, the transmission-result report is the same whether a document to be transmitted by facsimile is composed of one sheet or a plurality of sheets. Therefore, only the first page of a document to be transmitted is shown.

Figure 6:
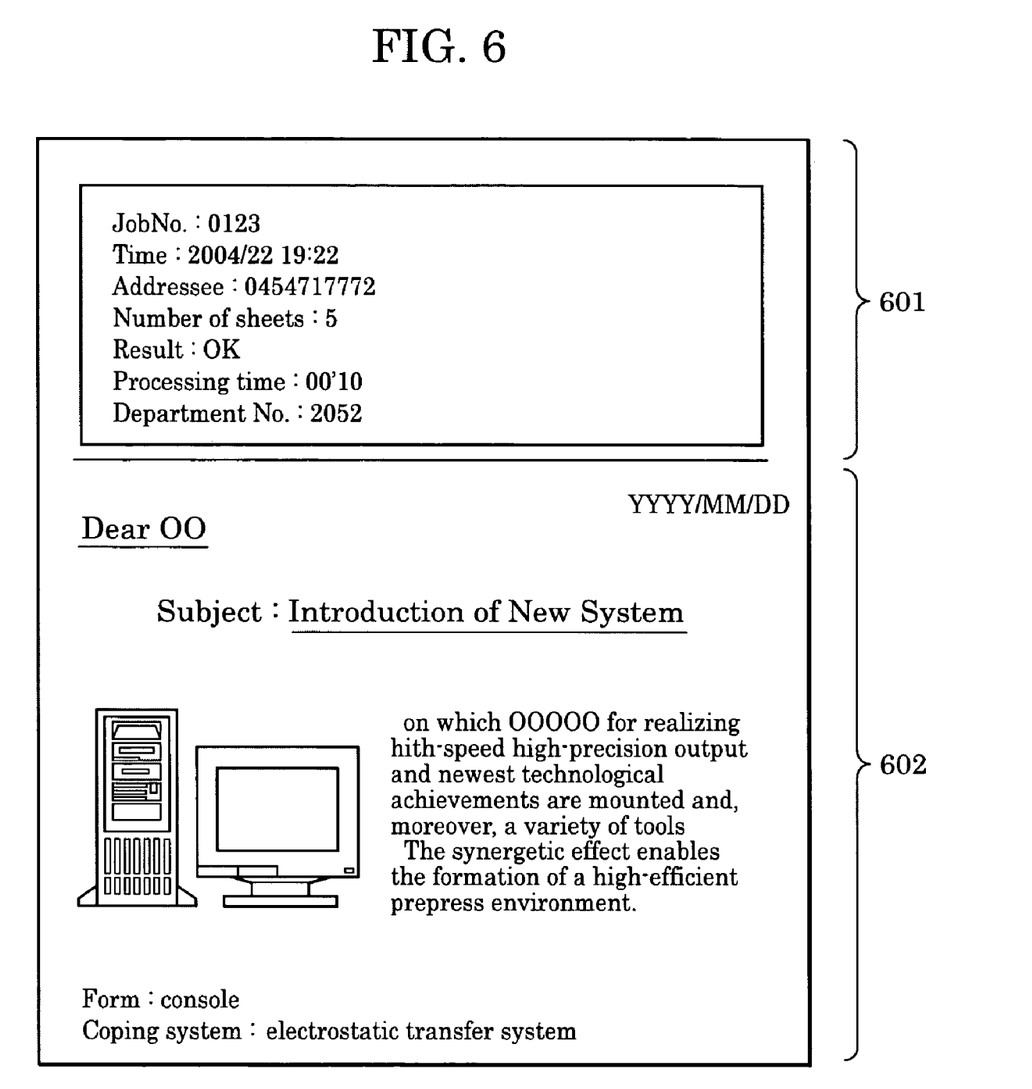
FIG. 6 shows an example of a transmission-result report printed with the MFP when the content of the manuscript is transmitted by a secure transmission mode.

FIG. 6 shows an example of the transmission-result report printed with the MFP when the document shown in FIG. 5 is transmitted in the normal mode without the secure-transmission being selected. In a portion 601 shown in FIG. 6, the transmission information generated in a bit map in the buffer memory 10 in step S206 is described. According to the present embodiment, the transmission time, the telephone number of the addressee, the number of transmitted sheets, the transmission result, and so forth are described. In a portion 602, the transmission image data added to the transmission information in step S207 is described. According to the present embodiment, the transmitted image data is printed on the same sheet of recording paper as the transmission information. That is, only a portion of the transmitted image data is printed on the transmission-result report.

Figure 7:
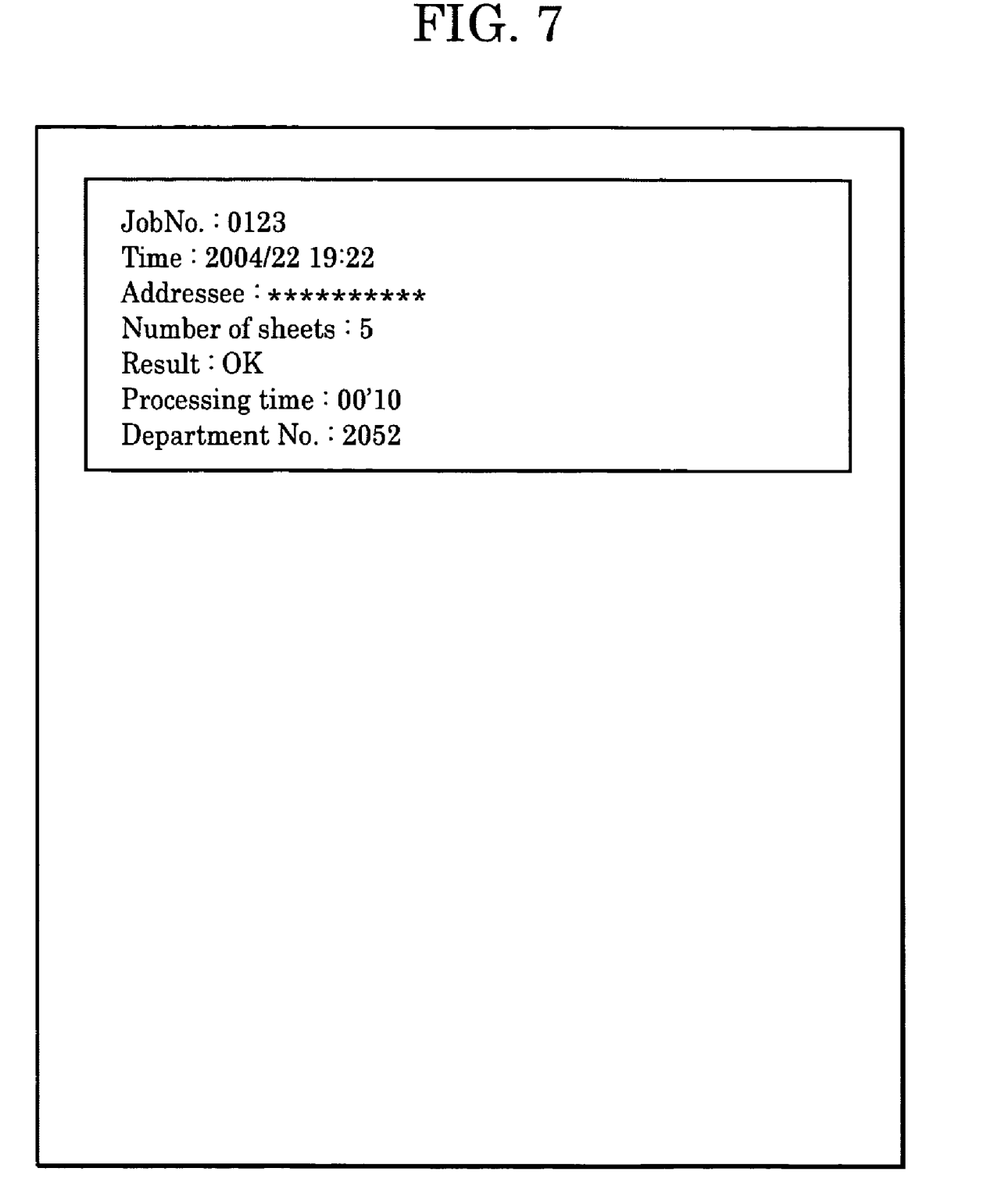
FIG. 7 shows an example of a transmission-result report printed with the MFP when the secure transmission is carried out.

FIG. 7 shows an example of the transmission-result report printed with the MFP when secure transmission is carried out for the document shown in FIG. 5. In secure transmission, the transmitted image data is not printed on the transmission-result report, but only the transmission information is printed, as illustrated in FIG. 7. Moreover, according to the present embodiment, the information of the addressee (in FIG. 7, the telephone number) is replaced by symbols or the like.

Second Embodiment

A second embodiment of the present invention will now be described. The hardware configuration of the MFP of the present embodiment is the same as that shown in FIG. 1. Thus, the description of the hardware configuration of the MFP of the present embodiment is not repeated.

Figure 8:
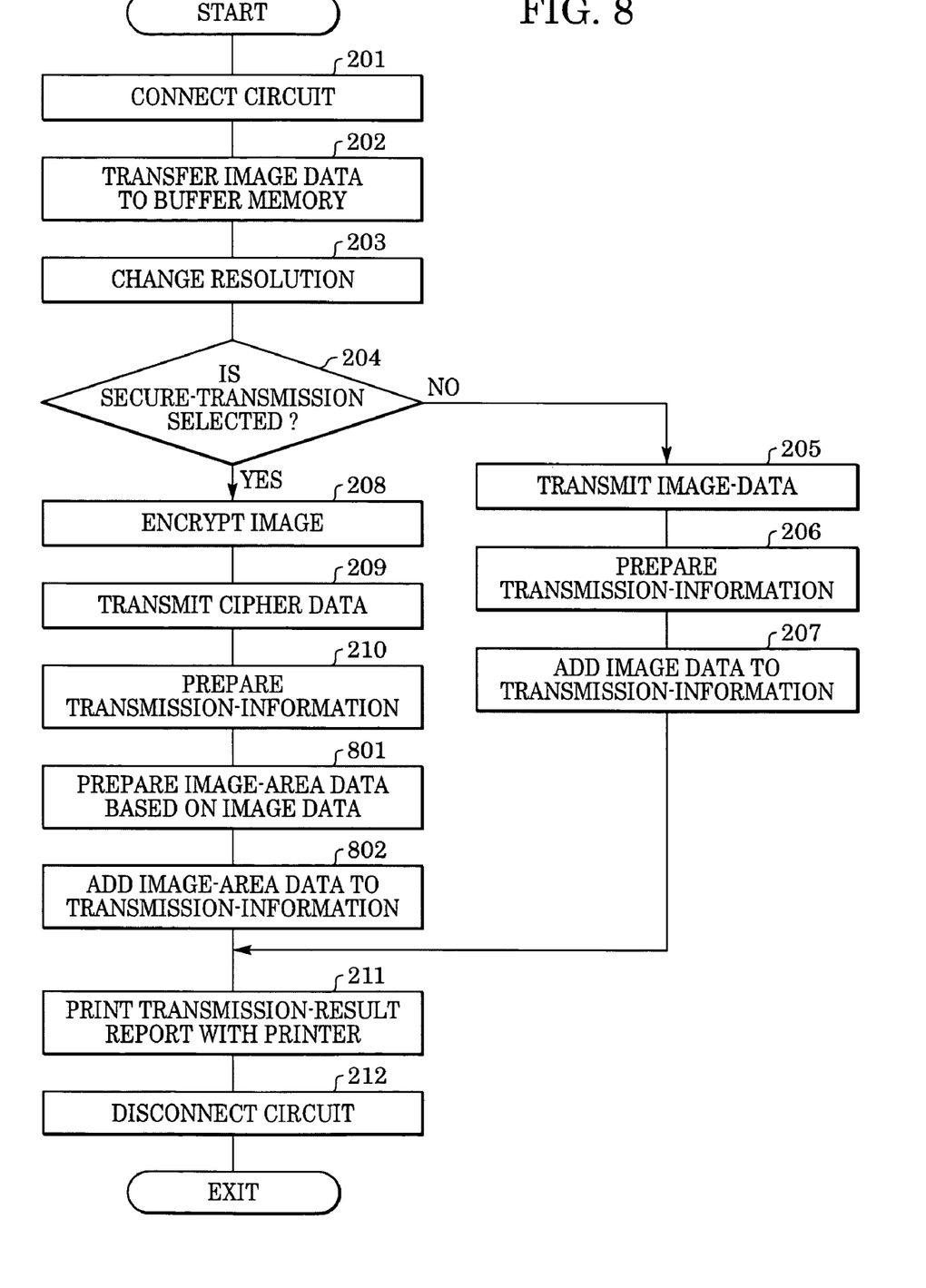
FIG. 8 is a flow-chart showing the facsimile-transmission operation carried out according to a second embodiment of the present invention.

FIG. 8 is a flow-chart showing the facsimile-transmission operation according to the present embodiment. It is presumed that image data to be transmitted is read through the reader 2 and stored in the memory unit 4 prior to the processing, as in the case of the first embodiment. Referring to FIG. 8, the parts of the operation that are the same as those of the first embodiment are represented by the same reference numerals as in FIG. 2. Only the parts of the operation different from those illustrated in FIG. 2 will be described.

Referring to FIG. 8, when the secure transmission is selected, the MFP transmits encrypted image data in step S209. The transmission information acquired from the microprocessor unit 9 is generated as bit map data in the buffer memory 10 in step S210.

After the generation of the transmission information in step S210 is completed, the MFP carries out the determination of an image area with respect to the image data before it is encrypted and generates the image area data (step S801). Image area determination refers to processing that occurs for dividing the area of the document into, for example, character image areas, graphic image areas, and photographic image areas by referring to the data provided in the document. The respective divided-areas are distinguished from each other based on image area data. In the MFP of the present embodiment, the image processing unit 12 carries out the image area determination and the preparation of image area data.

Since the image data in the buffer memory 10 has been encrypted in the encryption/decryption unit 16 for secure transmission, the image data to be subjected to the image area determination is acquired again from the memory unit 4. The image data read from the memory unit 4 is transferred to the image processing unit 12 (the image data may be temporarily stored in the buffer memory 10, and is then transferred to the image processing unit 12). The image areas are determined in the image processing unit 12, and the generated image area data is stored in the buffer memory 10. In the present embodiment, the image data is transferred directly from the memory unit 4 to the image processing unit 12. In another embodiment, the image data may be temporarily stored in the buffer memory 10 and then transferred to the image processing unit 12.

After the image area data is stored in the buffer memory 10, the MFP adds a part of the image area data transferred in step S801 to the transmission information generated in step S210. Thus, data for use as a transmission-result report is generated in the buffer memory 10 (step S802).

Figure 9:
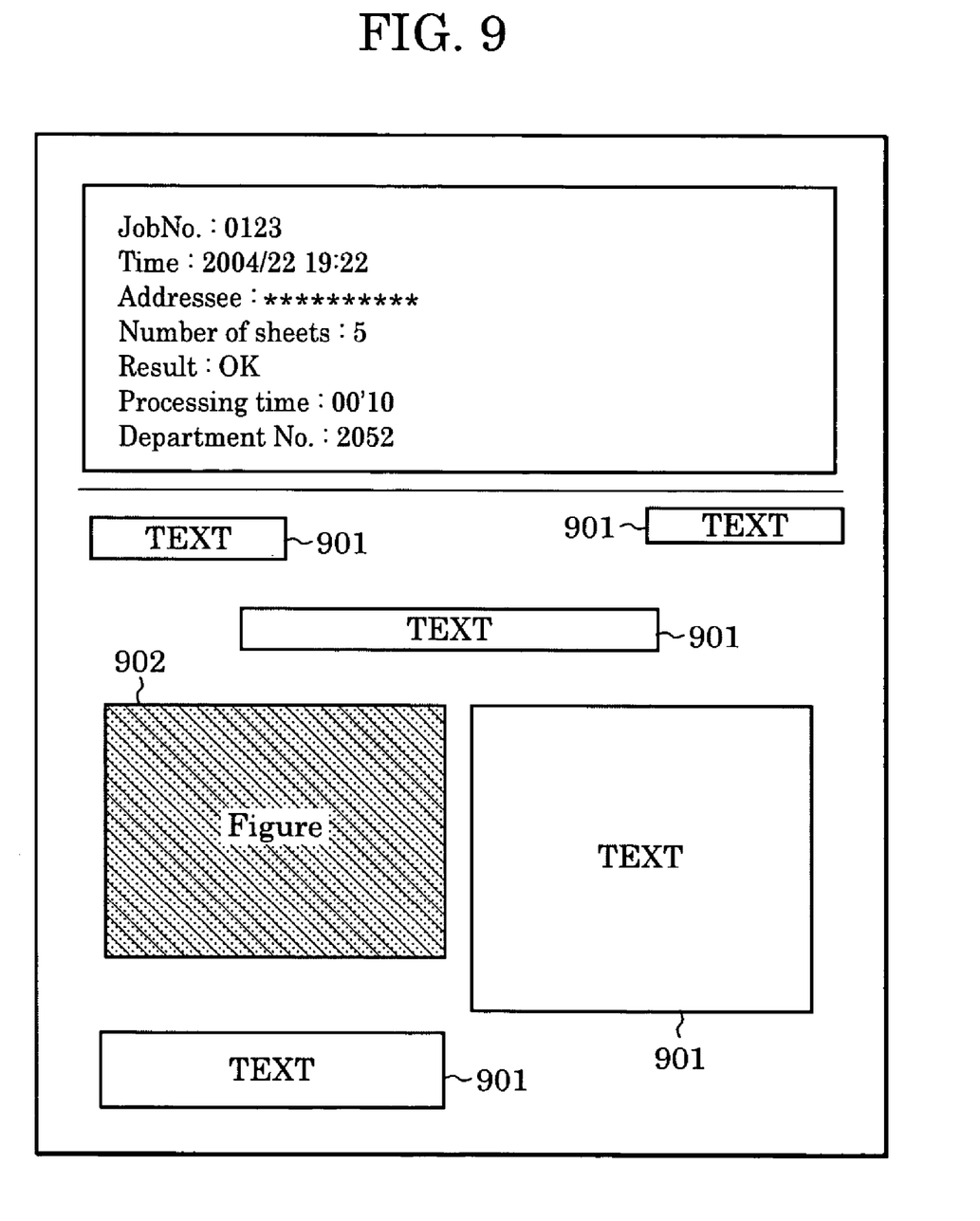
FIG. 9 shows an example of a transmission-result report generated when the secure transmission is carried out according to a second embodiment of the present invention.

FIG. 9 shows an example of the transmission-result report generated when the manuscript illustrated in FIG. 5 is secure-transmitted according to the present embodiment.

In FIG. 9, the image area determination processing determines that portions 901 are character image portions. These portions are depicted as boxes containing the word "TEXT".

Similarly, the image area determination processing determines that portion 902 is a graphic image portion. This portion is depicted as a filled-box containing the word "Figure". The descriptions of the photographic image portions of FIG. 5 are omitted. The photographic image portions are printed on the transmission-result report in such a manner that they can be distinguished from the other portions, as in the case of the character image portions and the graphic image portions.

As seen in FIG. 9, in the case of secure transmission, the image area data is added to the transmission-result report in lieu of the image data. Thus, in secure transmission, the security of the transmitted contents can be ensured by preventing persons other than the sender from seeing them. In addition, information useful to determine whether the intended document has been transmitted to the addressee can be provided to the sender.

Figure 10:
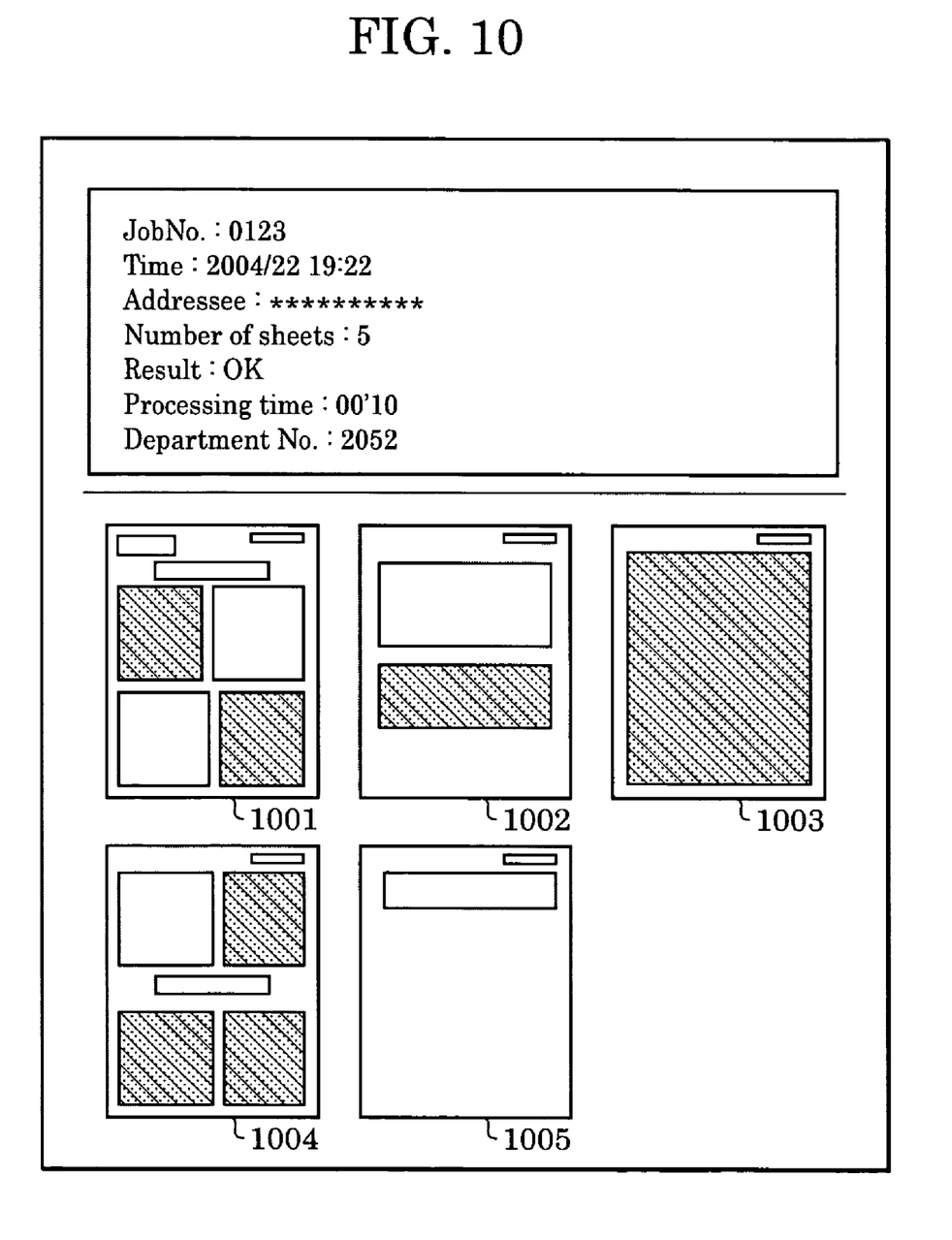
FIG. 10 shows another example of the transmission-result report generated when the secure transmission is carried out according to a second embodiment of the present invention.

FIG. 10 shows another example of the transmission-result report according to the present embodiment. In FIG. 10, the image area data for all of the secure-transmitted images appear as they do in FIG. 9. However, the transmission-result report in FIG. 10 contains all of the image area data (areas 1001 to 1005) of the transmitted document on a single page.

As described above, in secure transmission, the transmission-result report is prepared and printed by a process different from that used in normal transmission. The result is that the content of the transmitted document is prevented from being printed on the transmission-result report when the transmission is completed or when a transmission error occurs. Thus, security can be ensured during secure transmission.

The above-description covers the transmission-results operation as it pertains to facsimile transmission. The present invention, however, is not restricted to facsimile-transmission. The present invention is applicable when transmission-results containing transmission images are output when the transmission operation is carried out by electronic mail, FTP, SMB, and other systems. In particular, in the case of transmission using network protocols such as electronic mail, FTP, SMB, and so forth, a transmission image is not transmitted through the telephone circuit 15 via the communication control unit 13 and the NCU 14, but is transmitted through the LAN 19 via the network control unit 18.

In addition, in the above-description, a manuscript to be transmitted is read through the reader 2 of the MFP. For example, the content of the manuscript may be input through the network control unit using the LAN 19.

The above described embodiments address the case where a facsimile-transmission operation resulted in a successful transmission. In another embodiment, the facsimile transmission operation is not successful. In this case, the present invention is able to output a transmission-result report as well.

In another embodiment, when secure transmission is selected, a predetermined transmission result report can be obtained regardless of the condition under which a transmission result report is to be outputted had been set in advance. For example, a transmission-result report can be output when the facsimile transmission was successful and when it was not, even if a user set or the default setting was that a transmission-result report is to be output only when the facsimile-transmission was successful.

The above described functions of the present invention can be achieved by a method in which a storage medium is supplied to a system or device, the storage medium having program code of software recorded thereon for realizing the above described functions, and a computer (CPU or MPU) for the system or device reads the program code stored in the storage medium and executes it.

In this case, the program code itself read from the storage medium executes the functions of the above-described embodiments. Thus, the program code itself or the storage medium storing the program code therein constitutes the present invention.

As a storage medium for supplying the program code, for example, a floppy, a hard disk, an optical disk, a magneto-optical disk, a CD-ROM, a CD-R, a magnetic tape, a non-volatile memory card, a ROM, and so forth can be employed.

When the program code read by the computer is executed, not only are the above-described functions of the embodiments realized, but also an OS working on the computer may carry out a part or the whole of the actual processing that realizes the above-described functions of the embodiments.

The program code read from the storage medium may be written to a memory provided on a function-extension board inserted into the computer or a function-extension unit connected to the computer, and a CPU provided on the function extension board or the function extension unit carries out a part or the whole of the actual processing, and by this processing, the above-described functions of the embodiments are realized.

While the present invention has been described with reference to what are presently considered the exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-394363 filed Nov. 25, 2003, which is hereby incorporated by reference herein.

What is claimed is:

1. An image communication device comprising:
   an image information transmission unit, which has plural image transmission modes including a normal transmission mode and a secure transmission mode, configured to transmit image information in each transmission mode;
   an image area information generation unit configured to divide the image information into at least one image area and to generate image area information which represents an image type of each image area;
   a transmission-result report generation unit configured to selectively generate one of a first transmission-result report or a second transmission-result report, wherein the first transmission-result report contains transmission-result information of the image information transmitted by the image information transmission unit and the image area information generated by the image area information generating unit when the image information transmission unit executes image information transmission processing in the secure transmission mode, and wherein the second transmission-result report contains the transmission-result information of the image information transmitted by the image information transmission unit and the image information when the image information transmission unit executes image information transmission processing in the normal transmission mode; and
   a transmission-result report output unit configured to output one of the first transmission-result report or the second transmission-result report generated by the transmission-result report generation unit.

2. An image communication device according to claim 1, wherein the types of images include at least one of a character image, a graphic image, or a photographic image.

3. An image communication device according to claim 1, wherein the transmission-result information contains at least addressee information representing a reception-end, and wherein the transmission-result report generation unit generates the first transmission-result report such that the addressee information is encrypted.

4. An image communication device according to claim 3, wherein encryption of the addressee information comprises replacing the addressee information with predetermined symbols.

5. A method of communicating an image comprising:
   transmitting image information in a normal transmission mode or a secure transmission mode;
   dividing the image information into at least one image area, and generating image area information which represents an image type of each image area;
   selectively generating one of a first transmission-result report or a second transmission-result report, wherein the first transmission-result report contains transmission-result information of the image information transmitted by said image information transmission and the image area information when the image information is transmitted in the secure transmission mode, and wherein the second transmission-result report contains the transmission-result information of the image information and the image information when the image information is transmitted the normal transmission mode; and
   outputting one of the first transmission-result report or the second transmission-result report.

6. A method of communicating an image according to claim 5, wherein the transmission-result information contains at least addressee information representing a reception-end, and wherein in the generation of a transmission-result report, the addressee information is encrypted.

7. A method of communicating an image according to claim 6, wherein encryption of the addressee information comprises replacing the addressee information with predetermined symbols.

8. A method of communicating an image according to claim 5, wherein the types of images include one of a character image, a graphic image, or a photographic image.

* * * * *